United States Patent [19]
Tojo et al.

[11] Patent Number: 6,162,404
[45] Date of Patent: Dec. 19, 2000

[54] CERAMIC CATALYTIC CONVERTER

[75] Inventors: Senta Tojo, Kariya; Hiroshi Mori, Ichinomiya; Katumi Okai, Kariya, all of Japan

[73] Assignee: Denso Corporation, Kariya, Japan

[21] Appl. No.: 08/905,800

[22] Filed: Aug. 12, 1997

[30] Foreign Application Priority Data

Aug. 14, 1996 [JP] Japan ................................ 8-233605
Nov. 5, 1996 [JP] Japan ................................ 8-310205

[51] Int. Cl.⁷ .............................. F01N 3/28; D04H 1/46
[52] U.S. Cl. ...................... 422/179; 422/180; 422/221; 428/921; 428/284; 428/298; 428/299
[58] Field of Search .................. 422/179, 221, 422/180, 177; 428/116, 593, 594, 920, 921, 284, 288, 297, 298–300

[56] References Cited

U.S. PATENT DOCUMENTS

| | | | |
|---|---|---|---|
| 4,863,700 | 9/1989 | Ten Eyck ................................ | 422/179 |
| 4,929,429 | 5/1990 | Merry ................................... | 422/179 |
| 4,985,212 | 1/1991 | Kawakami et al. ................... | 422/179 |
| 5,376,341 | 12/1994 | Gulati ................................... | 422/179 |
| 5,419,876 | 5/1995 | Usui et al. ............................ | 422/177 |
| 5,580,532 | 12/1996 | Robinson et al. ..................... | 422/179 |
| 5,724,735 | 3/1998 | Ickes et al. ........................... | 29/890 |

FOREIGN PATENT DOCUMENTS

| | | |
|---|---|---|
| 480 082 | 4/1992 | European Pat. Off. . |
| 643 204 | 3/1995 | European Pat. Off. . |
| 84 25 922 | 1/1987 | Germany . |
| 42 28 267 | 3/1993 | Germany . |
| 195 09 029 | 12/1995 | Germany . |
| 57-116118 | 7/1982 | Japan . |
| 61-072818 | 4/1986 | Japan . |
| 4-026649 | 6/1992 | Japan . |
| 6-238173 | 8/1994 | Japan . |
| 7-024330 | 1/1995 | Japan . |
| WO 94/16134 | 7/1994 | WIPO . |

OTHER PUBLICATIONS

Patent Abstracts of Japan, "Holding Member for Catalytic Converter", Honda Motor Co. Ltd., vol. 095, No. 007, Aug. 31, 1995, JP 07 102961 A, Apr. 18, 1995.

*Primary Examiner*—Hien Tran
*Attorney, Agent, or Firm*—Pillsbury Madison & Sutro LLP

[57] ABSTRACT

A catalytic converter has a ceramic catalytic support, a cylindrical casing for holding the catalytic support therein and a holding member disposed between the catalytic support and the casing. The holding member has a plurality of net-like layers, each of which is parallel to a circumferential surface of the catalytic support and has fibers randomly tangled with each other. Because of this structure, when the catalytic converter is assembled, damage to the fibers and separation of the fibers of the holding member can be prevented. As a result, the holding member can securely and steadily hold the catalytic support within the casing.

12 Claims, 12 Drawing Sheets

SAMPLE 1

SAMPLE 2

SAMPLE 3

CERAMIC CATALYTIC CONVERTER

CROSS REFERENCE TO RELATED APPLICATIONS

This application is based upon and claims the benefit of priority of the prior Japanese Patent Applications No. 8-233605 filed on Aug. 14, 1996, and No. 8-310205 filed on Nov. 5, 1996, the contents of which are incorporated herein by reference.

BACKGROUND OF THE INVENTION

1. Field of the Invention

The present invention relates to a ceramic catalytic converter disposed in an exhaust passage of an engine for a vehicle.

2. Related Arts

In general, a ceramic catalytic converter is provided in an exhaust passage of an engine for a vehicle for purifying exhaust gas. Such a ceramic catalytic converter typically has a ceramic catalytic support carrying a catalyst layer on a surface thereof, a metallic cylindrical casing for holding the catalytic support therein, and a holding member disposed on a circumferential surface of the catalytic support in a gap between the catalytic support and the cylindrical casing.

The ceramic catalytic support is conventionally made of a cordierite-system ceramic material ($2MgO.2Al_2O_3.5SiO_2$) having a low thermal expansion coefficient and this material generally has been utilized for the ceramic catalytic support for years. The catalyst layer formed on the surface of the catalytic support includes noble metals such as platinum (Pt), rhodium (Rh), lead (Pd) and the like for converting undesirable ingredients such as carbon monoxide (CO), hydrocarbon (HC), oxides of nitrogen and the like included in the exhaust gas from the engine into harmless gases and water.

The holding member is utilized to prevent damage to the ceramic catalytic support which does not have a sufficient mechanical strength. The holding member generally has an elastic body made of various kinds of ceramic fibers. For example, as shown in FIG. 20A, a mat-like holding member 9 disclosed in JP-A-7-102961 is made of ceramic fibers which have a length of 30 mm or more, and are oriented generally in one direction. The holding member 9 is disposed on a ceramic catalytic support 12 (shown in FIG. 20B) so that the orientation of the ceramic fibers is generally parallel to an axial direction of the ceramic catalytic support 12.

However, the ceramic fibers forming the holding member 9 are oriented in one direction and hardly intertwined with each other. Therefore, when tensile force is applied to the holding member 9 in a perpendicular direction with respect to the orientation of the ceramic fibers, the ceramic fibers are liable to be separated from each other. A shearing force applied on the holding member 9 in a direction parallel to the elongating direction of the ceramic fibers also can easily cause the separation of the ceramic fibers. The separation of the ceramic fibers loosens the holding member 9, resulting in a decrease of the holding force of the holding member 9 for holding the ceramic catalytic support 12 in the cylindrical casing. As a result, damage to the catalytic support 12 may occur.

The above-mentioned problem is more likely to arise in a high temperature atmosphere. In the high temperature atmosphere, the thermal expansion coefficients of the ceramic catalytic support 12 and the cylindrical casing are different from each other, so that the gap between the ceramic catalytic support 12 and the cylindrical casing increases. Accordingly, the ceramic catalytic support 12 is liable to rattle within the cylindrical casing. In addition, when manufacturing the holding member 9, it is technically difficult to arrange the ceramic fibers during lamination so that they are oriented in one direction.

SUMMARY OF THE INVENTION

The present invention has been made in view of the above-mentioned problems and an object of the present invention is to provide a ceramic catalytic converter having a catalytic support securely and steadily held within a cylindrical casing via a holding member.

This object is achieved according to a first aspect of the present invention by providing a catalytic converter having a holding member disposed between a circumferential surface of a catalytic support and a casing and including fibers disposed two-dimensionally in parallel to the circumferential surface of the catalytic support and randomly tangled with each other. Because the fibers are disposed two-dimensionally in parallel with the circumferential surface of the catalytic support and tangled with each other, in a case where tensile or shearing force is applied to the holding member in a direction along the circumferential surface of the catalytic support, no separation of the fibers constituting the holding member occurs. Accordingly, untangling the fibers and decreasing the holding force of the holding member which holds the catalytic support within the casing is prevented. As a result, the catalytic support can be held in the casing securely and steadily via the holding member.

Preferably, the holding member includes multiple net-like layers, each of which is two-dimensionally parallel to the circumferential surface of the catalytic support and has the fibers randomly tangled with each other. Accordingly, even if compressive or releasing force is applied to the holding member in the radial direction of the catalytic support, that is, in a perpendicular direction with respect to the circumferential surface of the catalytic support, buckling of the fibers is less susceptible to occur, thereby preventing damage to the fibers. As a result, the decrease of the holding force of the holding member can be prevented. Here, the forces applied to the holding member include forces accompanying a thermal shock cycle of the catalytic converter corresponding to an operated state of an engine such as stop, start, and combustion states, in addition to forces generated by vibrations of the engine and of a vehicle in a travelling state. The thermal shock cycle of the catalytic converter causes a change of the gap between the casing and the catalytic support which have a thermal expansion coefficient different from each other, thereby generating the compressive and releasing forces applied to the holding member. However, as mentioned above, the holding member according to the present invention can securely and steadily hold the catalytic support in the casing even if the above-mentioned forces are applied thereto.

Preferably, the holding member does not include any thermally expanding materials and does not undergo phase transition at a temperature lower than the temperature of the circumferential surface of the catalytic support in a state where exhaust gas is clarified by the catalytic converter. Therefore, the surface pressure of the holding member applied to the catalytic support, that is, the reverting force at a unit area of the holding member, can be kept constant regardless of the temperature of the holding member. As a result, the holding member can hold the catalytic support steadily and securely regardless of the temperature thereof. Because of this, the catalytic converter can be disposed on an upstream side of an exhaust pipe in an exhaust passage, and catalysts supported on the catalytic support can be activated just after the engine is started, resulting in a high exhaust purification rate just after the engine is started.

Preferably, the fibers of the holding member are made of only $Al_2O_3$ and $SiO_2$ (hereinafter called alumina fibers), and the content of $Al_2O_3$ is in a range of 70 wt % to 95 wt %. In a case where the content of $Al_2O_3$ in the alumina fibers is lower than 70 wt %, the alumina fibers undergo phase transition in the high temperature atmosphere in which the catalytic converter is operated, resulting in the decrease of the reverting force at an unit area of the holding member, that is, the decrease of the surface pressure of the holding member. On the other hand, in a case where the content of $Al_2O_3$ in the alumina fibers is more than 95 wt %, in a process of manufacturing the alumina fibers, it becomes difficult to increase the purity of the alumina fibers, resulting in increase of the manufacturing cost of the alumina fibers.

Preferably, the catalytic support has a cylindrical shape with an end surface in an axial direction thereof on a downstream side in the exhaust passage, and the holding member has a cylindrical member for holding the catalytic support therein and a protruding portion at an end of the cylindrical member on a downstream side with respect to the holding member. The protruding portion protrudes in a radial direction of the catalytic support to abut the end surface of the catalytic support. More preferably, the catalytic converter has a stopper disposed on a downstream side of the catalytic support and the protruding portion of the holding member simultaneously abuts the stopper between the end surface of the catalytic support and the stopper. In this case, not only frictional force generated between the holding member and the circumferential surface of the catalytic support but also reverting force of the holding member applied to the end surface of the catalytic support functions as the holding force of the holding member. As a result, the holding member can securely fix the catalytic support in the casing. The holding member may have a marking portion along the protruding portion to clear the position of the protruding portion when the holding member is assembled. A protrusion, a groove, a painted portion or the like can be adopted as the marking portion.

The above object is achieved according to a second aspect of the present invention by providing a method of manufacturing a catalytic converter which includes steps of preparing the above-mentioned holding member, disposing the holding member on the circumferential surface of the catalytic support, inserting the holding member into a casing having an internal diameter smaller than the external diameter of the holding member, and decreasing the diameter of the casing. More preferably, the step of decreasing the diameter of the casing is performed by utilizing a drawing passage having an inlet, an outlet and a tapered portion disposed between the inlet and the outlet. As a result, the catalytic support can be fixed within the casing through the holding member.

According to the above-mentioned method, the casing can have a uniform surface pressure at the entire circumference thereof, thereby preventing the catalytic support from rattling within the casing even in the case where the engine is operated. The holding member also can have a uniform surface pressure at the entire circumference thereof, thereby preventing damage to the fibers. Especially, as mentioned above, if the holding member has the fibers arranged two-dimensionally in parallel with the circumferential surface of the catalytic support, the damage to the fibers generated in the step of decreasing the diameter of the casing can be suppressed.

In the step of inserting the holding member into the casing, it is preferable that a difference between the internal diameter of the casing and the external diameter of the holding member is 10 mm at most. Accordingly, the holding member and the catalytic support can be positioned within the casing without causing any damage to the fibers of the holding member. In addition, it is preferable that the thickness of the casing before the step of decreasing the diameter of the casing be 2.0 mm at most. Accordingly, the step of decreasing the casing becomes easy.

An outermost casing may be disposed on the outside of the casing. In this case, the thickness of the casing can be decreased, whereby high durability and high assembling performance of the catalytic converter can be obtained at the same time. The outermost casing can be made of the same material as that of the casing. Otherwise, the outermost casing may be made of material having a thermal expansion coefficient equal to or lower than that of the casing to obtain the high durability of the catalytic converter.

As mentioned above, the casing is extruded from the drawing passage after passing through the tapered portion in the drawing passage, so that the diameter of the casing is decreased. In this case, it is desired that the casing is pushed by an extruding plate through another casing set on an inlet side in the drawing passage. Accordingly, it is not necessary that the diameter of the extruding plate is changed, and the step of decreasing the diameter of the casing can be successively repeated with high efficiency.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS

Embodiments according to the present invention will be described hereinunder with reference to the drawings.

First Embodiment

Figure 1:
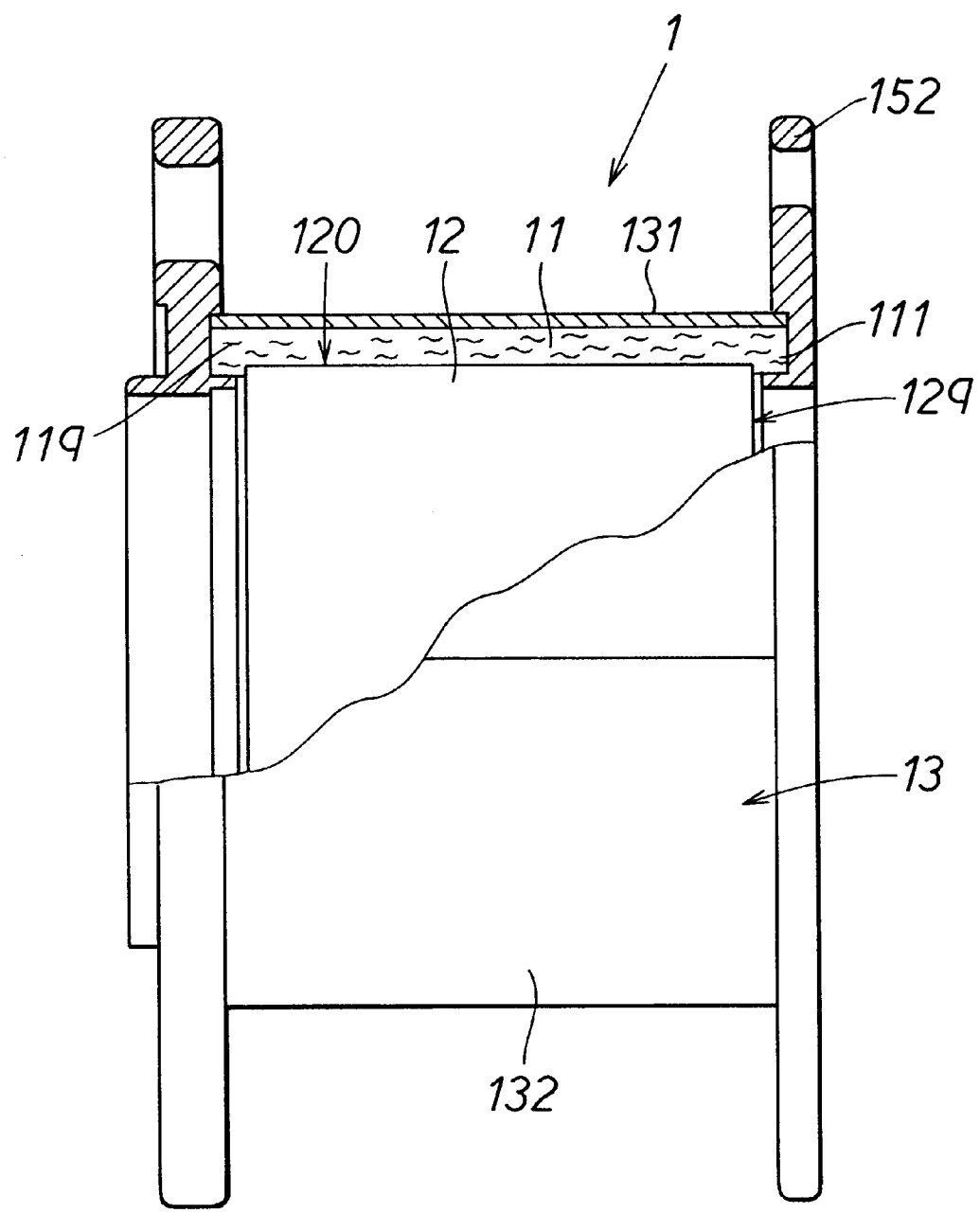
FIG. 1 is a partial cross-sectional view showing a ceramic catalytic converter in a first preferred embodiment according to the present invention.

A ceramic catalytic converter 1 in a first preferred embodiment of the present invention is disposed in an exhaust passage of an engine for a vehicle. As shown in FIG. 1, the ceramic catalytic converter 1 has a ceramic catalytic support 12, a cylindrical casing 13 which holds the ceramic catalytic support 12 therein, and a holding member 11 disposed on a circumferential surface 120 of the ceramic catalytic support 12 in a gap between the ceramic catalytic support 12 and the cylindrical casing 13.

The ceramic catalytic support 12 has a cylindrical shape with a diameter of 71 mm and a length of 60 mm, and has plural gas-flow cells 121 (see FIG. 3) therein through which exhaust gas flows, thereby forming a honeycomb structure. The thickness of each of the walls partitioning the catalytic support 12 into the gas-flow cells 121 is 0.08 mm–0.13 mm. The ceramic catalytic support 12 is made of a cordierite-system ceramic material ($2MgO.2Al_2O_3.5SiO_2$) having a low thermal expansion coefficient. Each of the gas-flow cells 121 has a catalyst layer on a surface thereof, and the catalyst layer includes Pt as a catalyst for purifying pollutants included in the exhaust gas. The catalyst layer is formed in the following way. First, the ceramic catalytic support 12 is impregnated with a slurry including γ-type aluminum oxide (γ-$Al_2O_3$), and is burned. Thereafter, the ceramic catalytic support 12 is immersed into an aqueous solution containing Pt, and then is burned again. Accordingly, the ceramic catalytic support 12 having the catalyst layer on the surface thereof is obtained.

Figure 2A:
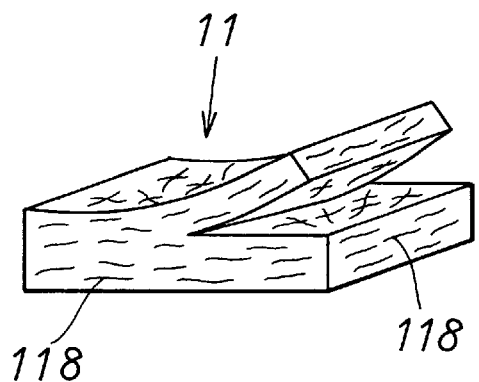
FIGS. 2A and 2B are schematic views showing a holding member of the ceramic catalytic converter in the first embodiment.
Figure 2B:
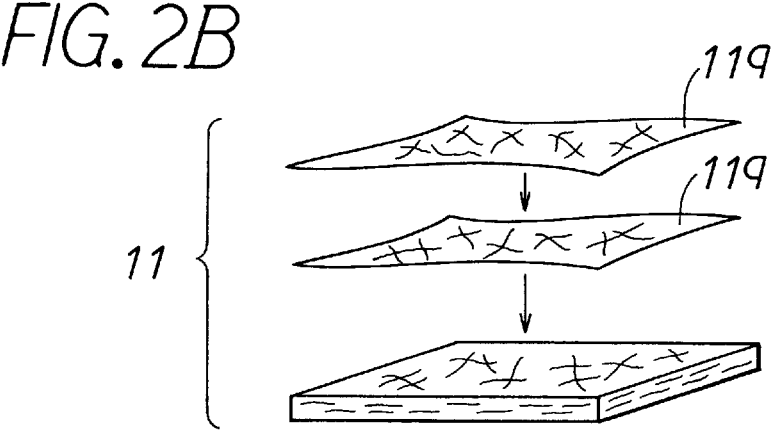
Figure 3:
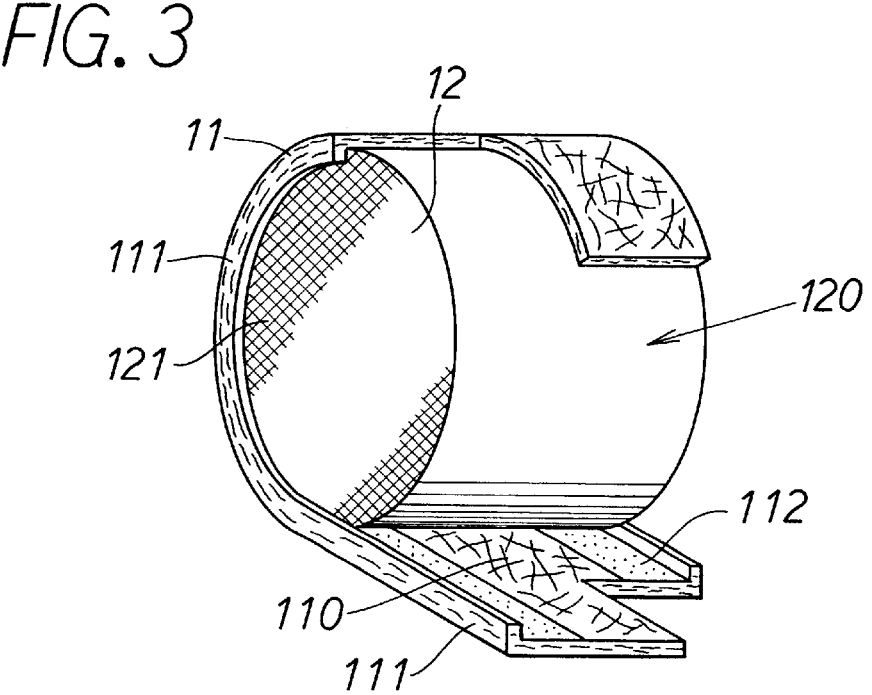
FIG. 3 is an explanatory view showing an installed state of the holding member on a ceramic catalytic support in the first embodiment.
Figure 8:
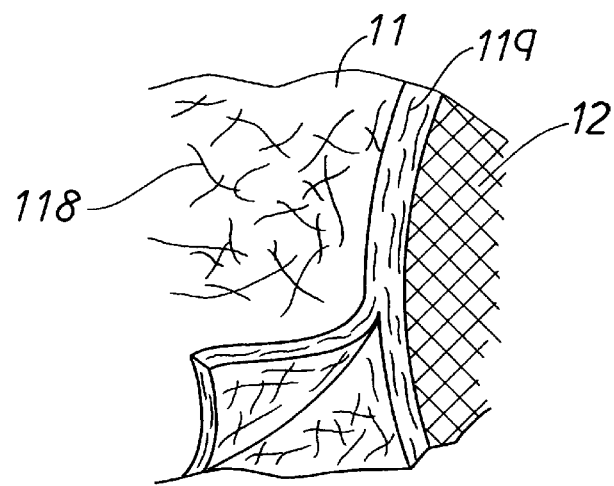
FIG. 8 is an explanatory perspective view showing a part of the holding member in the first embodiment.

The holding member 11 has multiple laminated fibrous layers 119 as shown in FIGS. 2A and 2B, and each of the fibrous layers 119 includes fibers 118 which are randomly tangled with each other in a common plane to form a net-like shape. Accordingly, in a state where the holding member 11 is disposed on the circumferential surface 120 of the ceramic catalytic support 12 as shown in FIGS. 1, 3 and 8, each of the fibrous layers 119 is parallel to the circumferential surface 120 of the ceramic catalytic support 12. That is, the fibers 118 of each layer 119 are tangled randomly and two-dimensionally in a common plane parallel to the circumferential surface 120 of the ceramic catalytic support 12. The holding member 11 has a protruding portion 111 having an L-shaped cross-section, and when mounted to the ceramic catalytic support 12, the protruding portion 111 abuts a flange 152 (see FIG. 1) described later and simultaneously abuts a downstream side end surface 129 of the ceramic catalytic support 12 provided on a downstream side thereof in an exhaust gas flowing direction. In this case, the flange 152 functions as a stopper.

The fibers forming the holding member 11 are alumina (aluminum oxide) fibers 118 made of $Al_2O_3$ of 72 wt % and $SiO_2$ of 28 wt %, and each diameter of the alumina fibers 118 is in a range of 2 μm to 4 μm. The holding member 11 does not include any thermally expanding materials which expand responsive to heat, thereby reducing the heat resistance of the holding member 11. The heat-resistant temperature of the holding member 11 is approximately 1800° C., so that the holding member 11 does not undergo a phase transition at a temperature (approximately 900° C.) at which the exhaust gas is purified. Before being mounted, the holding member 11 including the laminated fibrous layers 119 has a thickness of approximately 15 mm and a bulk density of approximately 0.08 g/cm³.

Figure 4:
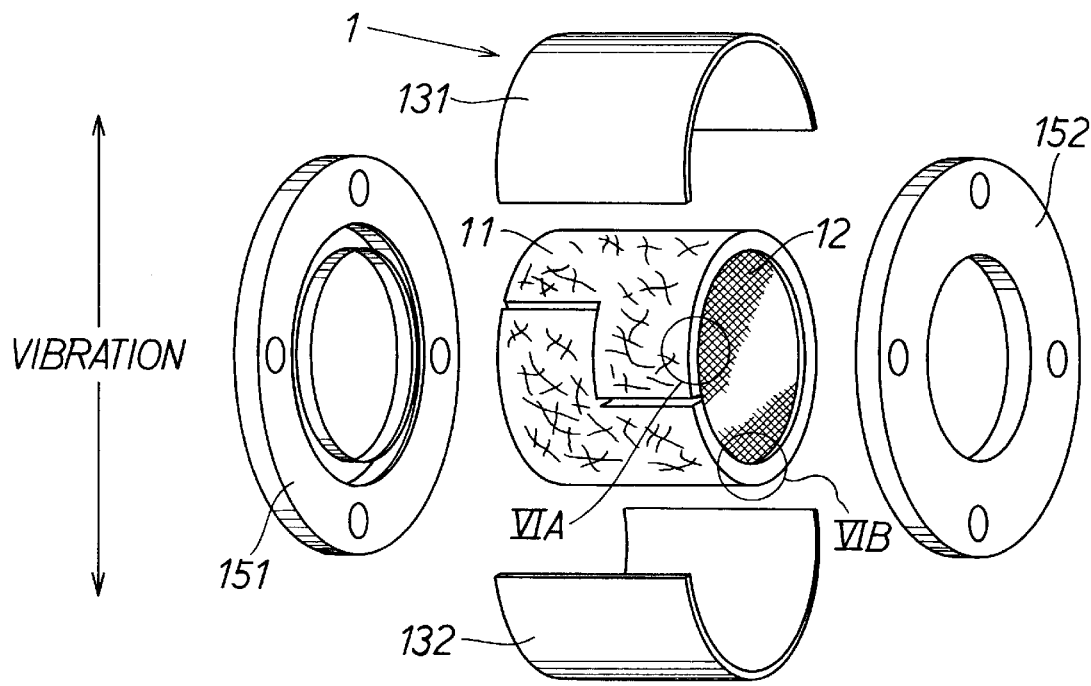
FIG. 4 is an exploded view of the ceramic catalytic converter in the first embodiment.

The cylindrical casing 13 is made of ferrite-system stainless steel, and has an internal diameter of 80 mm, a width of 75 mm, and a plate thickness of 1.5 mm. As shown in FIG. 4, the cylindrical casing 13 includes two semi-cylindrical parts 131 and 132 formed by a pressing method to have a half-round shape in cross-section. The flange 152 shown in FIGS. 1 and 4 is made of ferrite-system stainless steel, and has an internal diameter of 67 mm, an external diameter of 94 mm, and a plate thickness of 6 mm. Another flange 151 shown in FIGS. 1 and 4 is also made of ferrite-system stainless steel, and has an internal diameter of 67 mm, an external diameter of 94 mm, and a plate thickness of 8 mm. In this embodiment, SUS 430 is employed as the above-mentioned ferrite-system stainless steel.

The ceramic catalytic converter 1 having the above-mentioned constitution is formed in the following way. First, a frame having a shape corresponding to the developed holding member 11 is prepared. The alumina fibers 118 are jetted out from a blowout nozzle into the frame. In this case, the blowout nozzle is set to jet out the alumina fibers 118 upwardly so that the alumina fibers 118 jetted out from the blowout nozzle fall into the frame by gravity. As a result, as shown in FIGS. 2A and 2B, the alumina fibers 118 are randomly tangled in a common plane to form a first net-like layer of the fibrous layers 119. Successively, the fibers 118 are disposed on the first layer of the fibrous layers 119 in the frame to be tangled randomly and two-dimensionally with each other in a common plane parallel to the first layer in the same way as mentioned above. By repeating this process, as a result, the holding member 11 having the plural laminated fibrous layers 119 is formed. In this embodiment, although the fibrous layers 119 are successively formed in the frame to overlap with each other, the fibrous layers 119 may overlap with each other after the fibrous layers 119 are separately formed. Next, the holding member 11 is impregnated with a binder material (for example, a phenolic resin, an epoxy resin or the like) and then is formed to have a shape shown in FIG. 3 having the protruding portion 111 and a recess 110 to correspond to the circumferential surface 120 of the ceramic catalytic support 12. In addition, an adhesive material 112 (for example, a commercial pressure sensitive adhesive double coated tape or the like) is disposed on the surface of the recess 110. The circumferential surface 120 of the ceramic catalytic support 12 is wrapped with the thus formed holding member 11. The holding member 11 is fixed to the circumferential surface 120 of the ceramic catalytic support 12 through the adhesive material 112 so that it does not overlap. Accordingly, each of the fibrous layers 119 becomes approximately two-dimensionally parallel to the circumferential surface 120 of the ceramic catalytic support 12.

Next, as shown in FIG. 4, the ceramic catalytic support 12 wrapped with the holding member 11 is covered with the semi-cylindrical parts 131 and 132 of the cylindrical casing 13 and edge portions of the semi-cylindrical parts 131 and 132 are welded together to form the cylindrical casing 13. Thereafter, the flanges 151 and 152 are fitted into the cylindrical casing 13 at both ends of the cylindrical casing 13, and are welded to one another. In this case, the entire circumferences of the flanges 151 and 152 are welded to the cylindrical casing 13 to prevent leakage of the exhaust gas. Accordingly, the ceramic catalytic converter 1 in the first embodiment can be obtained.

Figure 5:
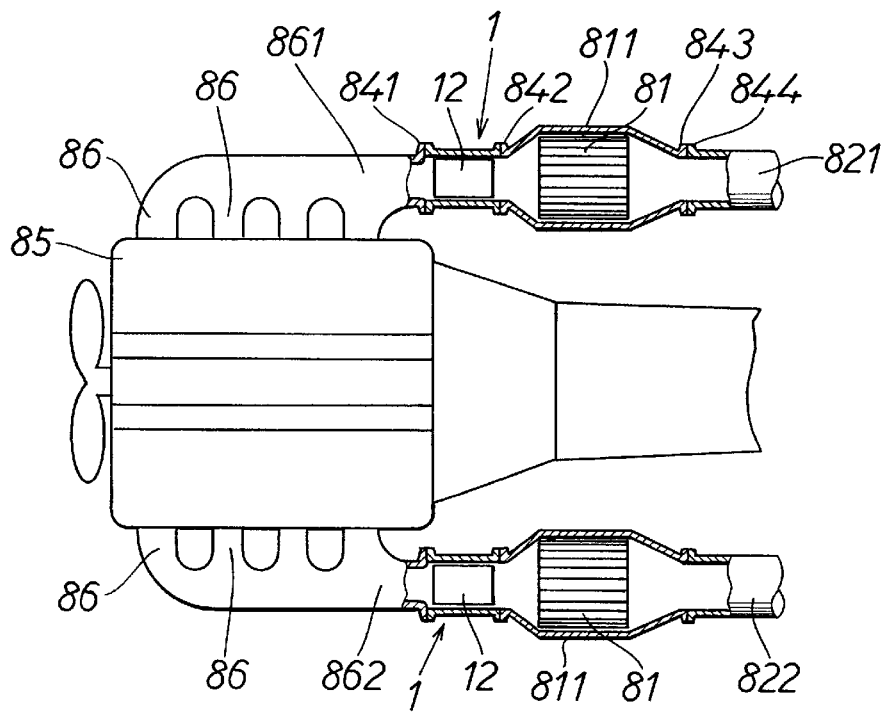
FIG. 5 is a schematic view showing an arrangement of the ceramic catalytic converter in an exhaust passage of an engine for a vehicle in the first embodiment.

Next, an operation of the above-mentioned ceramic catalytic converter 1 will be explained referring to FIG. 5. As mentioned above, the ceramic catalytic converter 1 is disposed in the exhaust passage of the vehicle engine 85 for purifying the exhaust gas. The displacement of the engine 85 is 4000 cc, and the engine 85 has eight manifolds 86, four of which form one of each of exhaust manifolds 861 and 862. The ceramic catalytic converter 1 is disposed on a downstream side of each exhaust manifold and a start catalyst 81 having a capacity of 1300 cc is disposed on a downstream side of the ceramic catalytic converter 1. In more detail, the ceramic catalytic converter 1 is fixed to a flange 841 of each of the exhaust manifolds 861 and 862 and a flange of the start catalyst 81 through gaskets (not shown) by means of bolts (not shown). The start catalyst 81 is held in a cylindrical casing 811 through a wire net or a ceramic fiber mat. Another flange 843 of the start catalyst 81 provided on the downstream side of the start catalyst 81 is fixed to a flange 844 of one of exhaust pipes 821 and 822. The exhaust pipes 821 and 822 meet on the downstream side of the start catalyst 81 and communicate with another catalyst (not shown) having a capacity of 1000 cc.

In the above-mentioned constitution, the temperature of the ceramic catalytic converter 1 rises to 400° C.–500° C. by the heat of the exhaust gas from the engine 85 for approximately 10 sec.–15 sec. after the engine 85 started. At that time, the engine 85 is in an idling state. Accordingly, the catalyst layer held on the ceramic catalytic support 12 is activated to purify the exhaust gas. Further, a thermal shock cycle test between 100° C. and 900° C. was performed on the engine 85 for 1000 times. The temperature of 900° C. was kept for 5 minutes, and one cycle was performed for 18 minutes. Even after this test, no damage occurred in the ceramic catalytic support 12 of the ceramic catalytic converter 1. In this case, the exhaust gas had a temperature of approximately 900° C. at most. Therefore, the temperature of the circumferential surface 120 of the ceramic catalytic support 12 rose to approximately 900° C., and the bulk density of the holding member 11 became approximately 0.26 g/cm$^3$.

Next, effects and features of the present invention will be explained. As mentioned above, the holding member 11 covering the circumferential surface 120 of the ceramic catalytic support 12 includes plural laminated fibrous layers 119 each of which includes the fibers 118 tangled two-dimensionally with each other in the common plane parallel to the circumferential surface 120 of the ceramic catalytic support 12. Therefore, when vibrations are applied to the ceramic catalytic converter 1 in a direction indicated by the allows in FIG. 4, at a portion surrounded by a circle VIA in FIG. 4, tensile force is applied to the holding member 11 in parallel with the direction in which the vibrations are applied to the ceramic catalytic converter 1. Further, at a portion surrounded by a circle VIB in FIG. 4, compressive force and releasing force are applied to the holding member 11 in parallel with the direction in which the vibrations are applied. The portions surrounded by the circles VIA and VIB in FIG. 4 are enlarged and shown in FIGS. 6A and 6B.

Figure 6A:
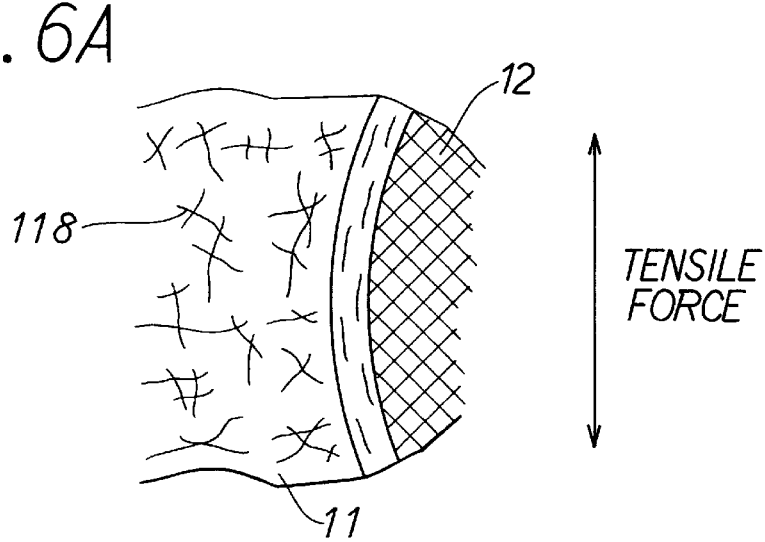
FIG. 6A is an enlarged perspective view showing a part surrounded by a circle VIA in FIG. 4.
Figure 6B:
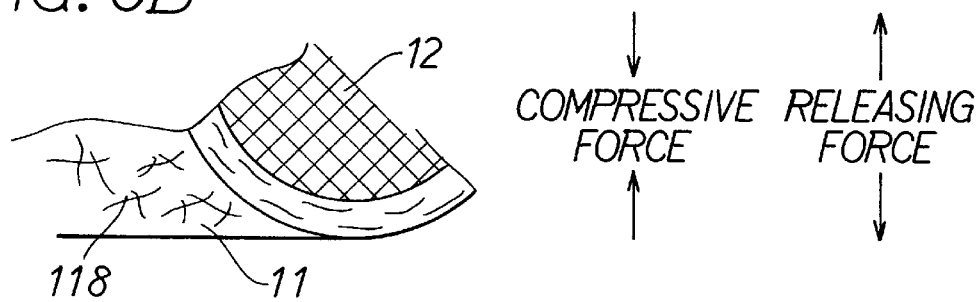
FIG. 6B is an enlarged perspective view showing a part surrounded by a circle VIB in FIG. 4.

In such a case, because the fibers 118 constituting the holding member 11 are disposed two-dimensionally in parallel with the circumferential surface 120 of the ceramic catalytic support 12 to tangle with each other, and even if the tensile force is applied to the holding member 11 approximately along the circumferential surface 120 of the ceramic catalytic support 12 as shown in FIG. 6A, no separation of the fibers 118 occurs. Further, as shown in FIG. 6B, even if the compressive force and the releasing force are applied to the holding member 11 in parallel with a radial direction of the ceramic catalytic support 12, buckling of the fibers 118 which damages the fibers 118 is less likely to occur. Therefore, according to the present invention, the ceramic catalytic converter 1 capable of securely and steadily holding the ceramic catalytic support 12 within the cylindrical casing 13 can be provided.

As mentioned above, the fibers 118 are made of alumina which does not undergo the phase transition thereof at a temperature of less than 1800° C. In addition, the holding member 11 does not include any thermally expanding materials to reduce the heat resistance of the holding member 11. Therefore, the volume and the surface pressure of the holding member 11 are not decreased by the heat from the exhaust gas from the engine 85, so that the holding member 11 can securely hold the ceramic catalytic support 12 within the cylindrical casing 13.

The ceramic catalytic converter 1 in the present invention is directly disposed on the downstream side of each of the exhaust manifold 861 and 862. Therefore, the ceramic catalytic converter 1 can accept a large amount of energy from the exhaust gas compared to a conventional catalytic converter which is disposed in the exhaust pipe. Further, the ceramic catalytic support 12 is made of thin ceramic so that the heat capacity of the ceramic catalytic converter 1 is relatively small. Because of this, the temperature of the ceramic catalytic converter 1 can easily rise in a short time after the engine 85 begins to activate the catalysts held on the ceramic catalytic support 12. That is, the ceramic catalytic converter 1 according to the present invention can perform the purification of the exhaust gas with a high exhaust purification rate just after the engine 85 is started.

Figure 7:
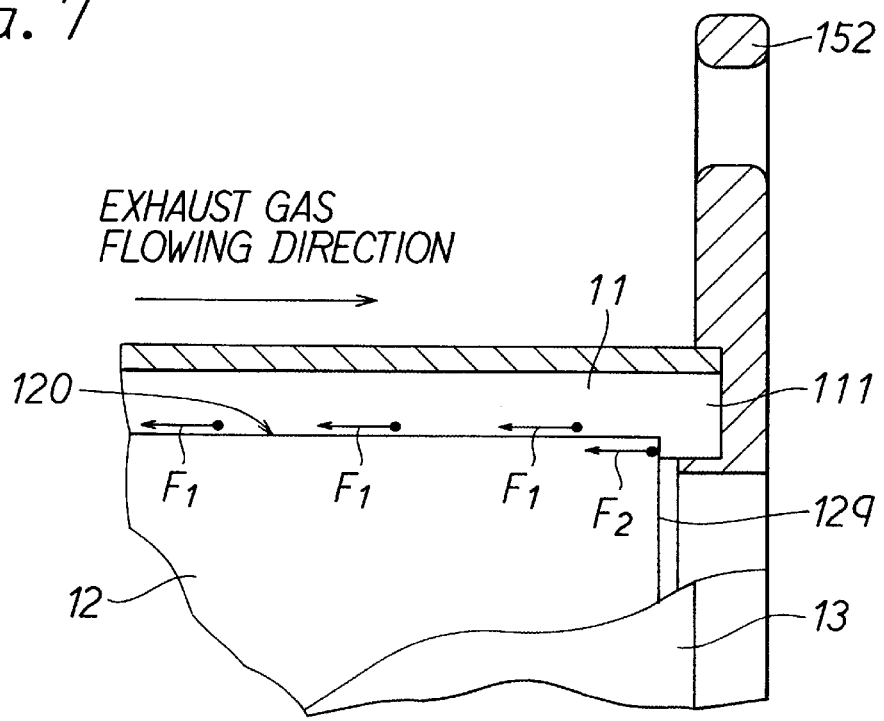
FIG. 7 is a fragmentary cross-sectional view showing the ceramic catalytic converter in the first embodiment.

As mentioned above, the holding member 11 has the protruding portion 111 which has the L-shape in cross-section and abuts the flange 152 and the downstream side end surface 129 of the ceramic catalytic support 12 at the same time. According to this constitution, as shown in FIG. 7, not only a frictional force F1 generated between the holding member 11 and the circumferential surface 120 of the ceramic catalytic support 12 but also a reverting force F2 of the holding member 11 applied to the downstream side end surface 129 of the ceramic catalytic support 12 functions as the holding force of the holding member 11 in the exhaust gas flowing direction for holding the ceramic catalytic support 12. As a result, the holding member 11 can securely hold the ceramic catalytic support 12 within the cylindrical casing 13.

Figure 9A:
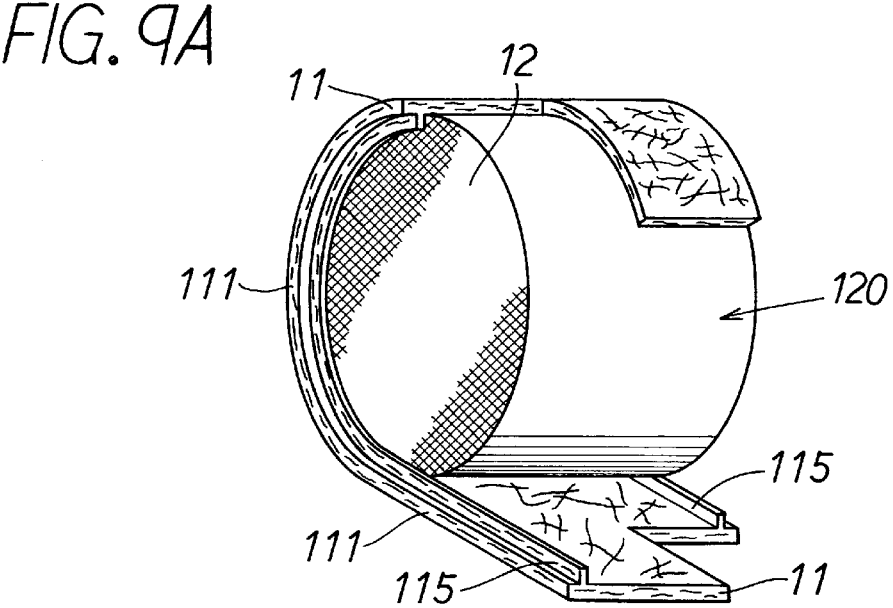
FIGS. 9A to 9C are explanatory views showing various types of marking portions of the holding member in the first embodiment.
Figure 9B:
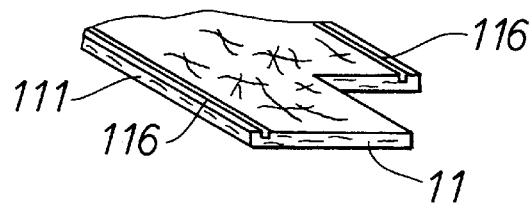
Figure 9C:
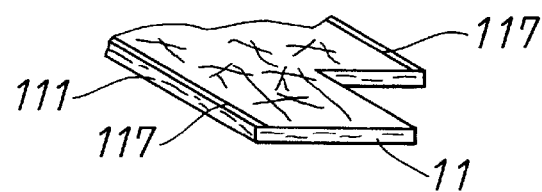

Further, because the holding member 11 is bonded on the ceramic catalytic support 12 by means of the adhesive material 112 disposed on the recess 110 of the holding member 11 in advance, the holding member 11 does not separate from the ceramic catalytic support 12 in the assembling process of the ceramic catalytic converter 1. As a result, the assembling of the ceramic catalytic converter 1 becomes easy. Further, the holding member 11 is formed with the protruding portion 111 and the recess 110 in advance, so that it becomes easy to position the holding member 11 with respect to the ceramic catalytic support 12. The holding member 11 may have marking portions 115 to make the position of the protruding portion 111 clearer for installation. As the marking portion 115, protrusions 115 shown in FIG. 9A, grooves 116 shown in FIG. 9B, painted portions 117 painted with a coating material shown in FIG. 9C or the like are applicable. By employing such marking portions 115, 116, or 117, the positioning of the holding member 11 with respect to the ceramic catalytic support 12 becomes easier. Further, the flanges 151 and 152 are disposed to cover the side surfaces of the holding member 11, thereby protecting the holding member 11 from the exhaust gas and preventing the scattering of the holding member 11. Therefore, it is not necessary to employ a special protecting member for protecting the holding member 11 from the exhaust gas, thereby resulting in low cost.

Figure 10A:
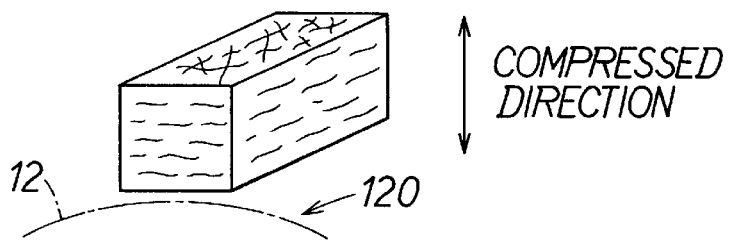
FIGS. 10A to 10C are schematic views showing examples utilized in a compression resiliency test in the first embodiment.
Figure 10B:
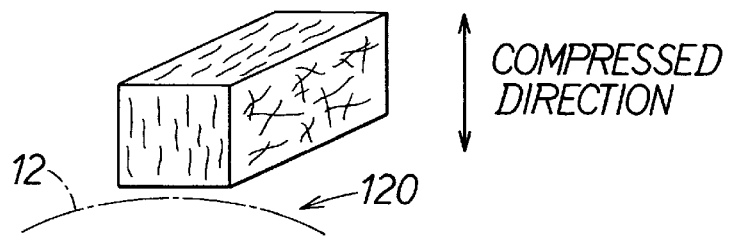
Figure 10C:
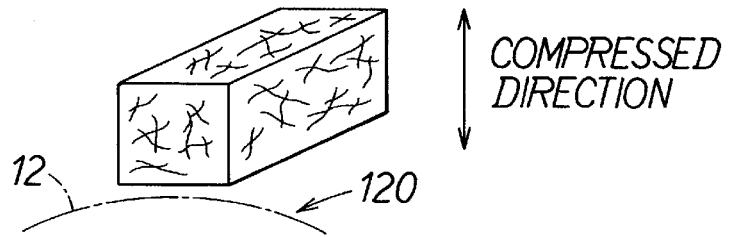

Next, results of a compression resiliency test performed on the holding member 11 to clarify the above-mentioned effects will be described referring to FIGS. 10A–10C and 11. To evaluate the holding member 11 according to the present invention, three samples 1 to 3 made of the alumina fibers and respectively having a bulk density of 0.08 g/cm$^3$ and a thickness of 25 mm were prepared. The samples 1 and 2 were formed by laminating plural layers each of which includes the alumina fibers randomly and two-dimensionally entangled with each other in a common plane in the same way as the holding member 11 was formed. In the compression resiliency test described later, the compressed direction of the sample 1 was set to be perpendicular to the laminated layers thereof as shown in FIG. 10A and the compressed direction of the sample 2 was set to be parallel to the laminated layers thereof as shown in FIG. 10B. The state of the sample 1 in the compression resiliency test corresponds to the compressed state of the holding member 11 in the present invention. The sample 3 was a comparative example and made of the alumina fibers which are completely and randomly tangled in three dimensions as shown in FIG. 10C.

Figure 11:
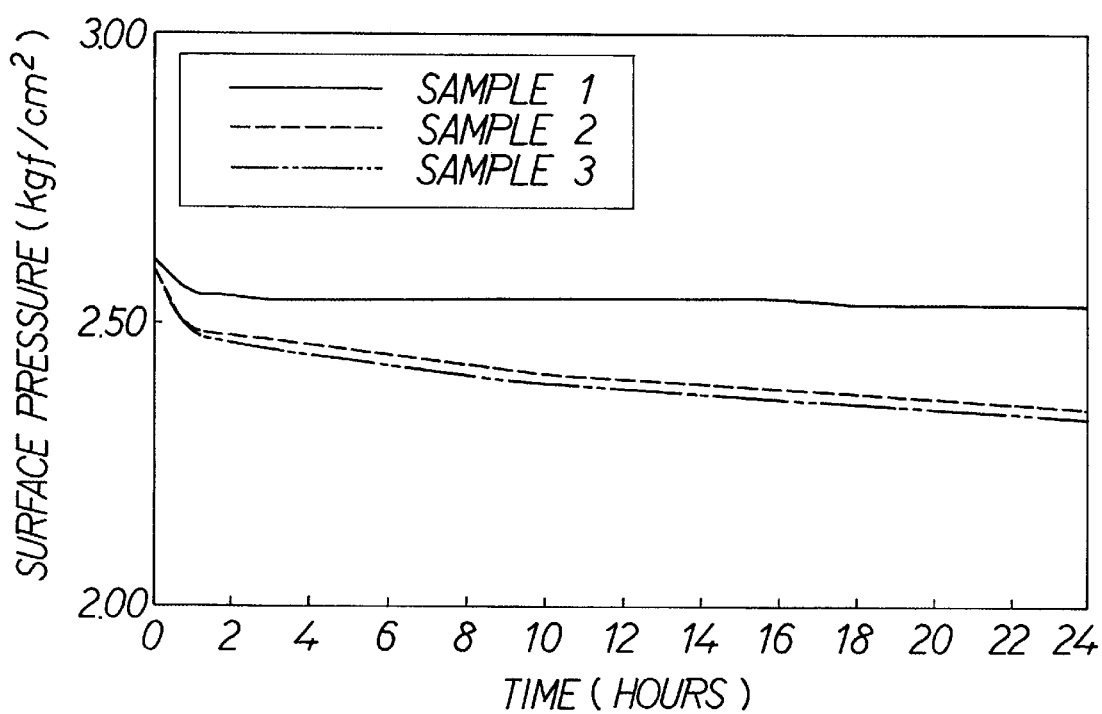
FIG. 11 is a graph showing results of the compression resiliency test in the first embodiment.

The compression resiliency test was performed on the samples 1 to 3 in the following way. First, thus formed samples 1 to 3 were compressed in the above-mentioned directions, respectively, to have a specific surface pressure thereof and then the samples 1 to 3 were left to gradually revert to their original form. In this state, the changing surface pressures of the samples 1 to 3 were measured by a load cell through a compressive member made of ceramic. The results of the measurement are shown in FIG. 11. The initial surface pressure of each sample was 2.6 kgf/cm$^2$.

The surface pressure of the sample 1 hardly changed and kept 97% of the initial surface pressure for 24 hours. The surface pressures of the samples 2 and 3 decreased to 90% and 89% of the initial surface pressure, respectively, in 24 hours. The samples 2 and 3 included the fibers arranged in parallel with the compressed direction, so that such fibers were buckled by the compressive force. As a result, the reverting forces of the samples 2 and 3 were lowered. Accordingly, it became apparent that the sample 1 corresponding to the holding member 11 in the present invention can hold the ceramic catalytic support 12 with a constant surface pressure more securely and steadily compared to the samples 2 and 3.

Figure 12:
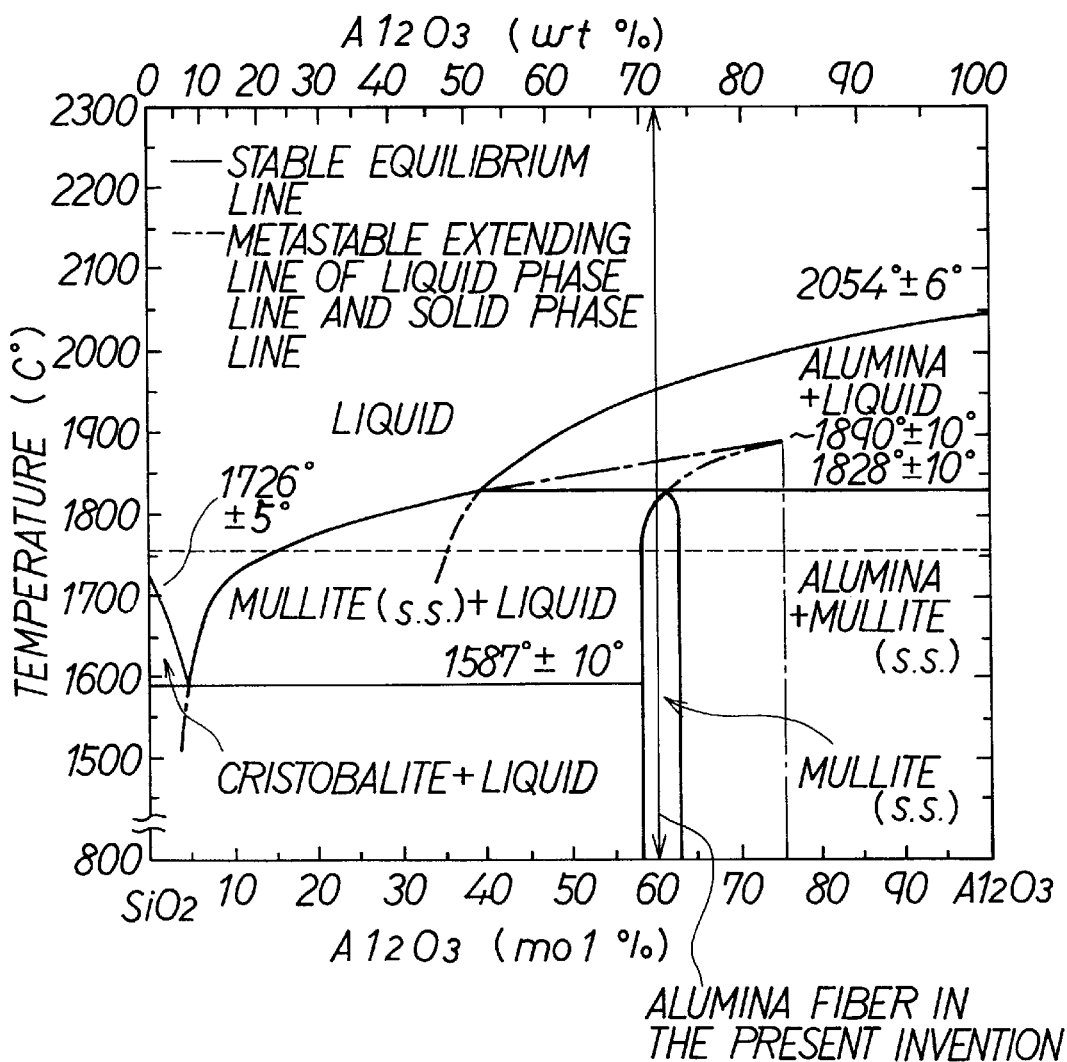
FIG. 12 is a phase diagram of an $Al_2O_3$—$SiO_2$ system.
Figure 13A:
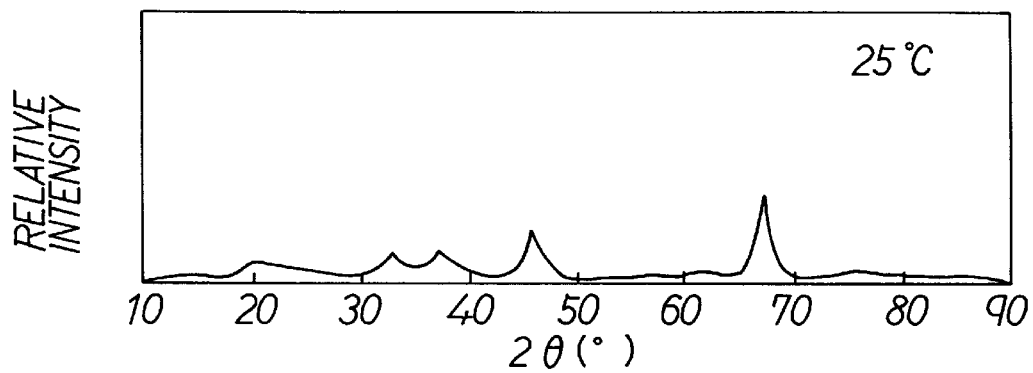
FIGS. 13A and 13B are graphs showing results of the X-ray analysis of alumina fibers constituting the holding member in the first embodiment.
Figure 13B:
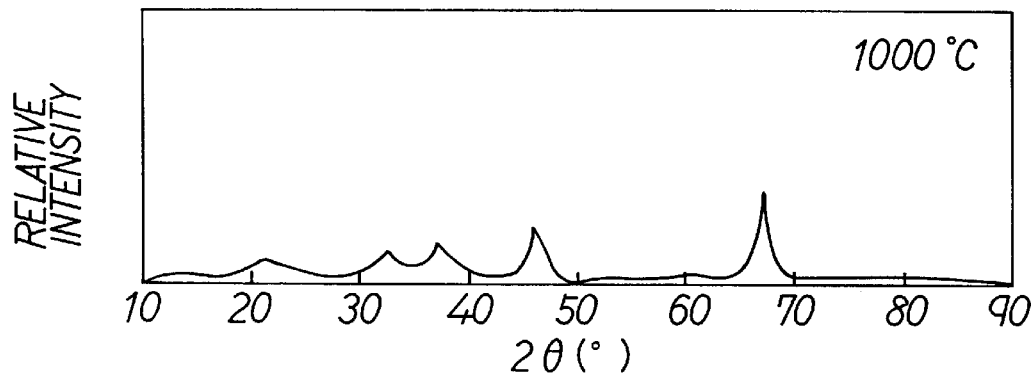

Next, characteristics of the alumina fibers employed in the present invention will be explained in more detail. As mentioned above, the alumina fibers are made of $Al_2O_3$ of 72 wt % and $SiO_2$ of 28 wt %, and do not undergo the phase transition thereof at a temperature lower than 1800° C. FIG. 12 shows the phase diagram of the $Al_2O_3$—$SiO_2$ system. FIGS. 13A and 13B show the results of the X-ray analysis performed on the alumina fibers at temperatures of 25° C. and 1000° C., respectively. According to the results shown in FIGS. 13A and 13B, the crystal structure of the alumina fibers at 25° C. was approximately the same as that of the alumina fibers at 1000° C.

Figure 14:
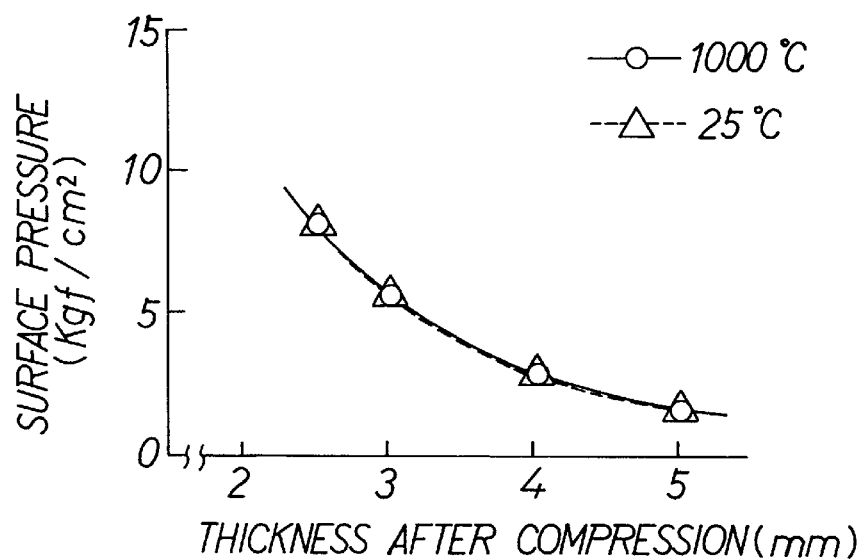
FIG. 14 is a graph showing relationships between surface pressures and thicknesses of the holding member after being compressed in the first embodiment.

Next, a measurement sample formed with the alumina fibers to have laminated layers in the same way as the holding member in the first embodiment was compressed to have a specific thickness under the temperatures of 25° C. and 1000° C. in the direction perpendicular to the laminated layers. The surface pressure of the measurement sample generated by the compression corresponds to the surface pressure, that is, to the elastic force at a unit area, of the holding member 11 generated in the state where the holding member 11 is installed in the cylindrical casing 13 to have the specific thickness as in the first embodiment. The relationship between the surface pressures and the thicknesses of the measurement sample after the compression is shown in FIG. 14. The measurement of the surface pressure was performed in the same way as mentioned above. According to FIG. 14, the surface pressure of the measurement sample at 25° C. was approximately equal to that of the measurement sample at 1000° C. at every thicknesses shown in FIG. 14. That is, it became apparent that the surface pressure of the measurement sample, that is, of the holding member 11, is stable even if the temperature changes.

A conventional holding member includes thermally expanding materials such as vermiculite, mica and the like, which cause the decrease of the surface pressure of the holding member by the heat deterioration thereof. Recently, it is not rare that the temperature of the holding member rises to more than 850° C. by the exhaust gas. Therefore, it is desired that the surface pressure of the holding member does not decrease under such high temperature. The surface pressure of the conventional holding member is, however, likely to decrease under the high temperature. As opposed to this, the surface pressure of the holding member 11 in the present invention is less susceptible to a decrease under the high temperature.

Second Embodiment

Figure 15A:
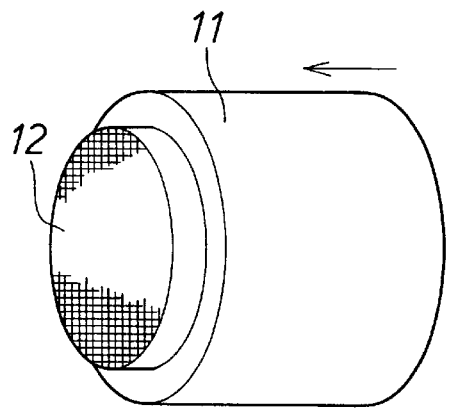
FIGS. 15A and 15B are schematic views for explaining processes of assembling a ceramic catalytic converter in a second preferred embodiment according to the present invention.
Figure 15B:
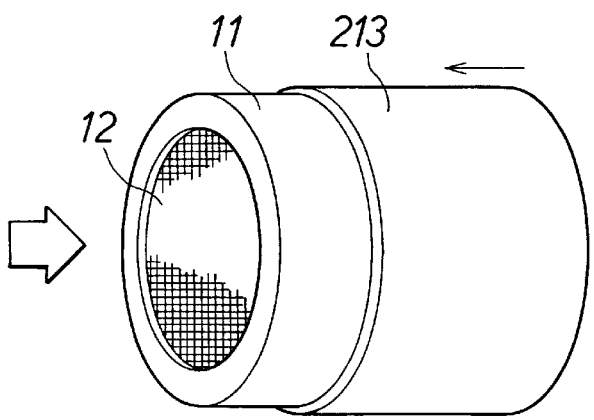

In the first embodiment, the cylindrical casing 13 has the semi-cylindrical parts 131 and 132 which are welded together after covering the ceramic catalytic support 12. As opposed to this, in a second embodiment, a ceramic catalytic converter includes a cylindrical casing 213 having an integrally formed cylindrical wall as shown in FIG. 15B. The cylindrical casing 213 holds the ceramic catalytic support 12 via the holding member 11, and then is drawn to decrease the diameter thereof, so that the ceramic catalytic support 12 is securely and steadily fixed in the cylindrical casing 213 by the holding member 11 interposed therebetween.

The method of installing the ceramic catalytic support 12 in the cylindrical casing 213 through the holding member 11 will be explained in more detail. First, the holding member 11 holds the ceramic catalytic support 12 therein. Next, the holding member 11 holding the ceramic catalytic support 12, the external diameter of which is a little larger than the internal diameter of the cylindrical casing 213, is inserted into the cylindrical casing 213, thereby forming an assembled body 10. To insert the holding member 11 into the cylindrical casing 213, an additional jig having a truncated cone-like shape may be used. Otherwise, the holding member 11 may be forced into the cylindrical casing 213 without using the additional jig to not be damaged. Thereafter, the assembled body 10 is drawn so that the diameter of the assembled body 10 decreases so that the holding member 11 has a specific surface pressure.

The holding member 11 is made of the same material and has the same laminated structure as the holding member in the first embodiment. The ceramic catalytic support 12 is also made of the same material and has the same dimensions as the catalytic support in the first embodiment. The cylindrical casing 213 is a cylindrically shaped pipe made of a ferrite-system stainless steel and initially has an internal diameter of 88 mm, a width of 73 mm, and a plate thickness of 1.5 mm. By the drawing process for decreasing the diameter of the cylindrical casing 13, the internal diameter, the width and the plate thickness of the cylindrical casing 213 are changed to 80 mm, 75 mm, and 1.6 mm, respectively.

Figure 16A:
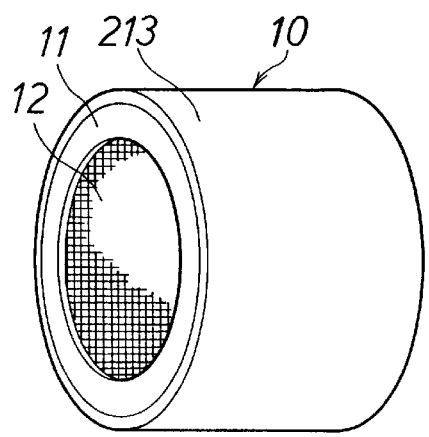
FIGS. 16A and 16B are schematic views for explaining processes of assembling the ceramic catalytic converter following the process shown in FIG. 15B.

Before holding the ceramic catalytic support 12, the holding member 11 is impregnated with a binder material such as a phenol resin, an epoxy resin or the like, and then is pressed to have a cylindrical shape with a thickness of 10 mm, a bulk density of 0.12 g/cm$^3$, and an external diameter of 91 mm. Next, as shown in FIG. 15A, the ceramic catalytic support 12 is inserted into the holding member 11 so that both end surfaces of the ceramic catalytic support 12 are recessed from end surfaces of the holding member 11 by approximately 5 mm (refer to FIG. 15B). Thereafter, as shown in FIG. 15B, the ceramic catalytic support 12 covered with the holding member 11 is inserted into the cylindrical casing 213 so that it does not rattle in the cylindrical casing 213. Accordingly, the positioning between the ceramic catalytic support 12 and the cylindrical casing 213 is done, so that the assembled body 10 shown in FIG. 16A is obtained. The process of inserting the ceramic catalytic support 12 into the cylindrical casing 213 is performed using a jig which is not shown.

Figure 16B:
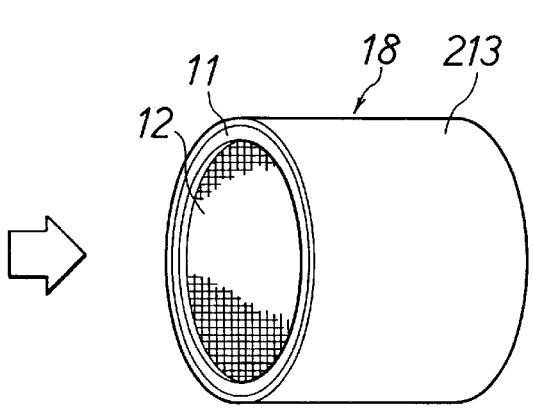
Figure 17A:
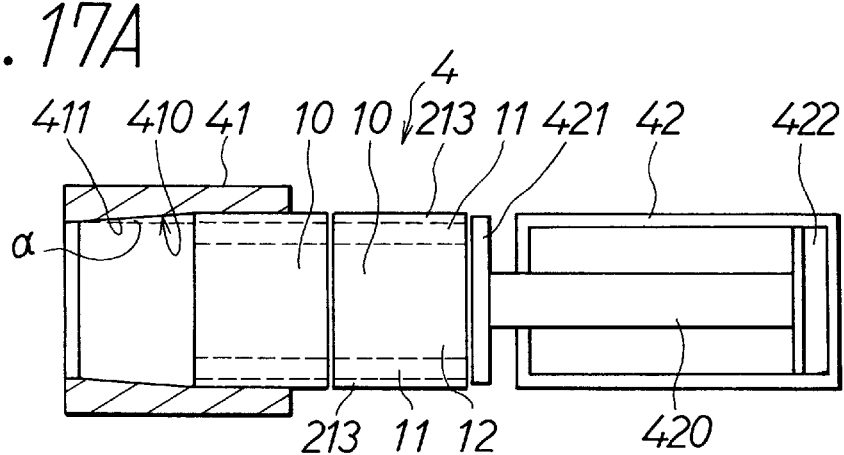
FIGS. 17A to 17C are explanatory views showing a drawing process of an assembled body shown in FIG. 16A.
Figure 17B:
Figure 17B:
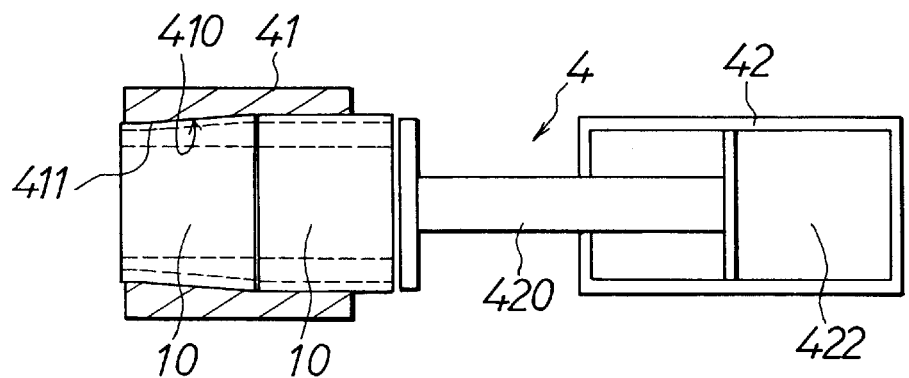
Figure 17C:
Figure 17C:
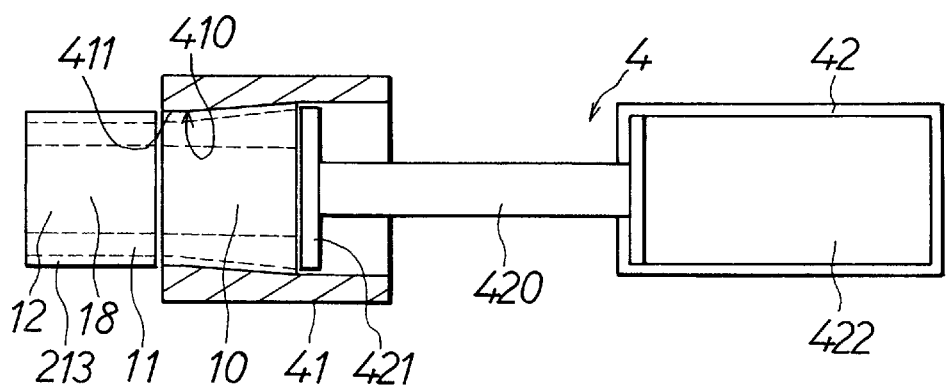
Figure 18:
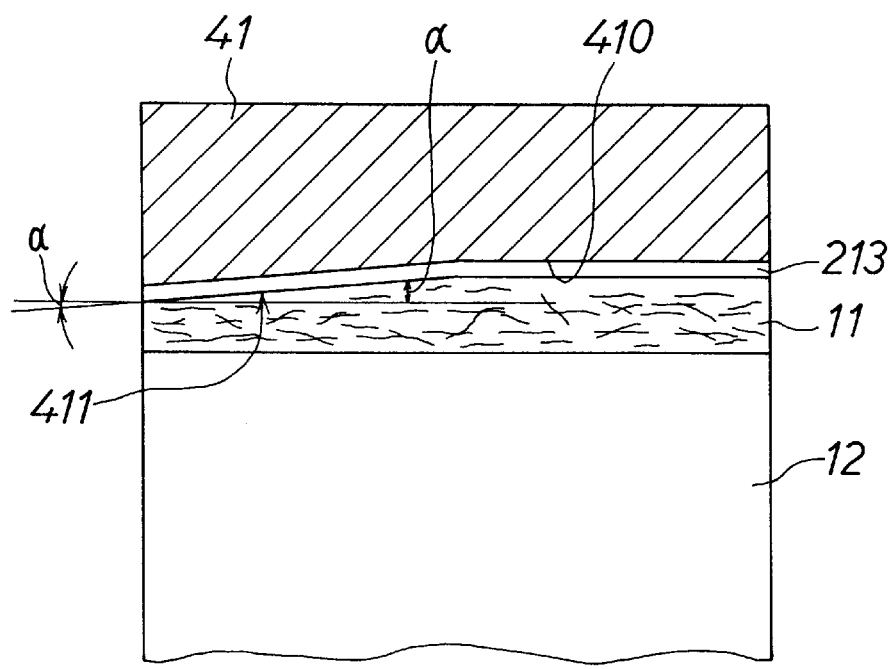
FIG. 18 is a partial cross-sectional view showing the assembled body during the drawing process shown in FIGS. 17A to 17C.

Next, as shown in FIG. 17A, the thus formed two assembled bodies 10 are set in a drawing machine 4. The drawing machine 4 is composed of a mold 41 and an extruding machine 42. As shown in FIGS. 17A and 18, a cavity 410 having a tapered portion 411 is formed in the mold 41. The cone angle α of the tapered portion 411 with respect to an axial direction of the cavity 410 is approximately 5°. In FIGS. 17A to 17C, numerals 420, 421 and 422 denote a piston, an extruding plate and an air chamber, respectively. After setting the assembled bodies 10 in the drawing machine 4, as shown in FIGS. 17A to 17C, the piston 420 of the extruding machine 42 is moved into the cavity 410 of the mold 41 to extrude the assembled bodies 10. The diameter of the assembled bodies 10 is decreased by passing through the tapered portion 411. In this case, the thicknesses of the cylindrical casing 230 and the holding member 11 are decreased, while the diameter of the ceramic catalytic support 12 is maintained. Consequently, the assembled body 10 shown in FIG. 16A is deformed into an extruded assembled body 18 shown in FIG. 16B. Successively, the other assembled bodies 10 are set in the drawing machine 4, and the above-mentioned drawing process is repeated. Thereafter, the flanges 151 and 152 are fitted into both ends of the extruded assembled body 18 as shown in FIG. 1 and are welded at the entire circumferences thereof to prevent the leakage of the exhaust gas. Thus, the ceramic catalytic converter in the second embodiment can be obtained. The other features are the same as those in the first embodiment.

Next, the effects of the ceramic catalytic converter in the second embodiment will be explained. In the method of assembling the ceramic catalytic converter, the assembled body 10 composed of the cylindrical casing 213, the ceramic catalytic support 12 and the holding member 11 is drawn so that the diameter of the cylindrical casing 213 is decreased and the holding member 11 has a specific surface pressure. In this process, the cylindrical casing 213 is deformed using the tapered portion 411 formed in the mold 41. Accordingly, the holding member 11 can have the specific surface pressure uniformly on the entire circumferential surface thereof. In addition, the diameter of the cylindrical casing 213 is decreased through the tapered deformation thereof until the holding member 11 has the specific surface pressure. Therefore, no damage to the fibers constituting the holding member 11 occur. As a result, the ceramic catalytic support 12 can be securely and steadily installed within the cylindrical casing 213.

Further, as shown in FIGS. 17A and 18, the cone angle α of the tapered portion 411 with respect to the axial direction of the cavity 410 is small. Accordingly, the fibers constituting the holding member 11 are less susceptible to rupturing due to bending, so that the holding member 11 can have the specific surface pressure by drawing. In addition, because the cone angle a of the tapered portion 411 is small, a reactive force generated on the tapered portion 411 when the assembled body 10 is extruded from the mold 41 is small, thereby making the process easy.

As mentioned above, the initial plate thickness of the cylindrical casing 213 is 1.5 mm, and it is not so thick that it produces cracks therein in the drawing process. Accordingly, the drawing process becomes easier. According to this embodiment, the ceramic catalytic converter including the ceramic catalytic support 12 securely and steadily held in the cylindrical casing 213 by the holding member 11 can be provided without causing any damage to the fibers constituting the holding member 11. In the second embodiment, after the holding member 11 impregnated with the binder material is pressed, the ceramic catalytic support 12 is inserted into the holding member 11, and then is inserted into the cylindrical casing 213. Therefore, it is easy to position the holding member 11, the ceramic catalytic support 12, and the cylindrical casing 213 relative to each other. Further, the holding member 11 is pressed before the installation, thereby making its handling easy. The decrease in diameter of the cylindrical casing 213 by drawing can be reduced by the pressed amount in the thickness of the holding member 11. In addition, the binder material included in the holding member 11 protects the holding member 11 when inserted into the cylindrical casing 213 with the ceramic catalytic support 12. The holding member 11 has the same cylindrical shape as the ceramic catalytic support 21 and the cylindrical casing 213 have, whereby the assembling process becomes easy.

When the holding member 11 holding the ceramic catalytic support 12 therein is inserted into the cylindrical casing 213, the difference between the external diameter of the holding member 11 and the internal diameter of the cylindrical casing 213 is 3 mm, and the bulk density of the holding member 11 before it is inserted into the cylindrical casing 213 is 0.12 g/cm$^3$, which are not so large. Therefore, the fibers forming the holding member 11 are not damaged when inserted into the cylindrical casing 213. In this embodiment, the drawing of the cylindrical casing 213 is performed by utilizing the drawing machine 4 having the mold 41 with the tapered portion 411. The drawing machine 4 has a simple structure, resulting in low manufacturing cost. In addition, the drawing process utilizing the drawing machine 4 includes the extruding process in which the assembled body 10 set on a front side in the mold 41 is extruded by another assembled body 10 set on a back side in the mold 41. Accordingly, the drawing process can be successively performed with high efficiency.

Third Embodiment

Figure 19:
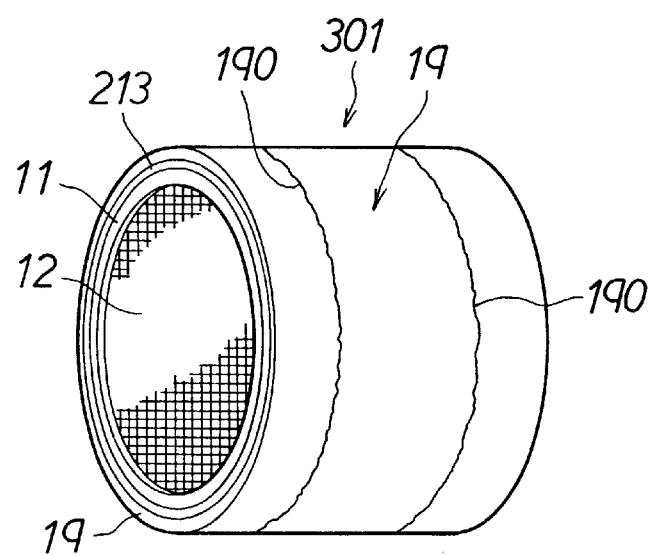
FIG. 19 is a schematic view showing a ceramic catalytic converter in a third preferred embodiment according to the present invention.
Figure 20A:
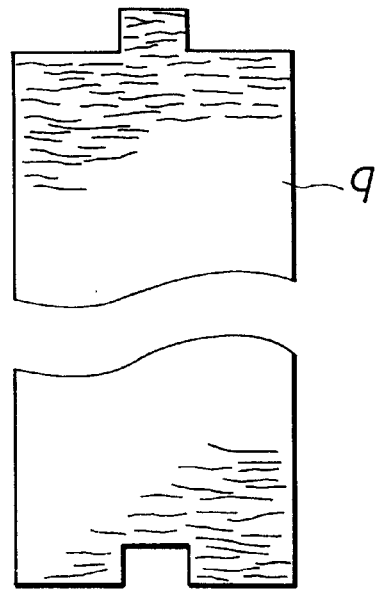
FIG. 20A is a schematic view showing a holding member according to the prior art.
Figure 20B:
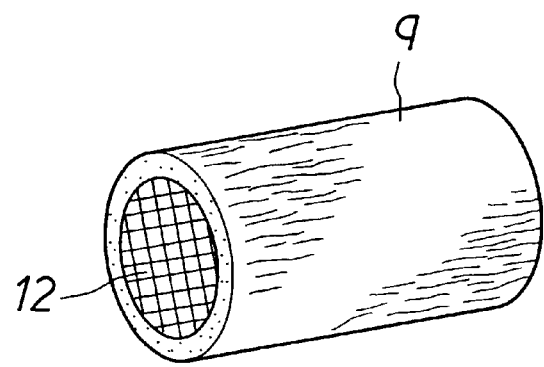
FIG. 20B is a schematic view showing the holding member mounted on a ceramic catalytic support according to the prior art.

A ceramic catalytic converter 301 in a third embodiment has a double pipe structure. That is, the ceramic catalytic converter 301 includes the ceramic catalytic converter manufactured in the same way as in the second embodiment and an outermost cylindrical casing 19 disposed on the outside of the cylindrical casing 213. The outermost cylindrical casing 19 has an internal diameter larger than the external diameter of the extruded assembled body 18 shown in FIG. 16B by approximately 0.5 mm. In the third embodiment, the extruded assembled body 18 formed in the same way as in the second embodiment is inserted into the outermost cylindrical casing 19 and is welded together on an entire circumference of the outer cylindrical casing 19 by a laser welding method or the like. In FIG. 19, lines 190 show welds. The other features in the third embodiment are the same as those in the first and second embodiments.

In the ceramic catalytic converter 301 in the third embodiment, because the outermost cylindrical casing 19 is employed, the thickness of the cylindrical casing 213 can be decreased (for example, to 1.0 mm). Accordingly, it becomes easy to decrease the diameter of the cylindrical casing 213 by drawing. The strength of the ceramic catalytic converter 301 is reinforced by the outermost cylindrical casing 19. As a result, according to the third embodiment, the ceramic catalytic converter 301 having high durability can be provided in an easy manufacturing process. The other features and effects are the same as those in the first and second embodiments.

In the above-mentioned embodiments, although the cone angle α of the tapered portion 411 of the mold 41 shown in FIGS. 17A and 18 is approximately 5°, it is not limited to that angle and it is desired that the cone angle α is in a range of 3° to 30° with respect to the axial direction of the cavity 410. Accordingly, bending force is not applied to the fibers constituting the holding member 11 to bend the fibers more than 30°. Therefore, the fibers of the holding member 11 become less susceptible to rupturing due to bending when the cylindrical casing 213 is drawn. Simultaneously, the increase of the reactive force at the tapered portion 411 can be suppressed, thereby making the drawing process easy. In a case where the cone angle α of the tapered portion 411 is less than 3°, an extruded length of the cylindrical casing 213 in the mold 41 becomes long, giving rise to a problem that the size of the drawing machine becomes large. To the contrary, in a case where the cone angle a of the tapered portion 411 is more than 30°, the fibers constituting the holding member 11 are liable to be broken by the drawing process and it becomes difficult to ensure that the holding member 11 has the specific surface pressure.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A catalytic converter for purifying exhaust gas from an engine, comprising:

a catalyst support having a plurality of cells in which the exhaust gas flows and having a circumferential surface, the cells having a catalyst layer on a surface thereof;

a casing for holding the catalytic support therein; and a holding member disposed between the circumferential surface of the catalytic support and the casing, the holding member including a plurality of layers, wherein each of the layers includes randomly entangled only two dimensionally and randomly with one another on a common plane approximately parallel to the circumferential surface of the catalytic support so that a longitudinal direction of each of the fibers is approximately parallel to the circumferential surface of the catalytic support.

2. A catalytic converter according to claim 1, wherein the fibers forming the plurality of net layers are made of an identical material.

3. A catalytic converter according to claim 1, wherein:

the circumferential surface of the catalytic support has a specific temperature during operation of the catalyst layer; and the fibers of the holding member are made of a ceramic material which has a phase transition temperature which is higher than the specific temperature.

4. A catalytic converter according to claim 1, wherein the fibers of the holding member are made of a material that does not expand at a temperature lower than a specific temperature at which the catalytic converter operates.

5. A catalytic converter according to claim 3, wherein the phase transition temperature of the fibers is higher than 850° C.

6. A catalytic converter according to claim 5, wherein the fibers of the holding member are made of only $Al_2O_3$ and $SiO_2$, and a content of $Al_2O_3$ is in a range of 70 wt % to 95 wt %.

7. A catalytic converter according to claim 1, wherein:

the catalytic support has a cylindrical shape with an end surface in an axial direction thereof, the end surface provided on a downstream side with respect to the catalytic support; and the holding member has a cylindrical member for holding the catalytic support therein and a protruding portion formed at an end of the cylindrical member, the protruding portion protruding in a radial direction of the catalytic support to abut the end surface of the catalytic support.

8. A catalytic converter according to claim 7, the converter further comprising a stopper disposed on the downstream side thereof with respect to the catalytic support to face the end surface of the catalytic support;

wherein, the protruding portion of the holding member is disposed between the end surface of the catalytic support and the stopper to abut the end surface of the catalytic support and the stopper at the same time.

9. A catalytic converter according to claim 1, wherein the holding member has a surface pressure that is uniform on an entire circumference of the holding member.

10. A catalytic converter for purifying exhaust gas from an engine, the converter comprising:
- a catalytic support having a plurality of cells in which the exhaust gas flows and having a circumferential surface;
- a casing for holding the catalytic support therein; and
- a holding member disposed between the circumferential surface of the catalytic support and the casing with a specific surface pressure that is uniform on an entire circumference of the holding member, the holding member including a plurality of layers, each of the layers being disposed in parallel to the circumferential surface of the catalytic support and composed of fibers entangled randomly and only two dimensionally with each other.

11. A catalytic converter according to claim 10, wherein the holding member contacts the circumferential surface of the catalytic support and the casing.

12. A catalytic converter according to claim 10, wherein the fibers are made of a material excluding a material that expands at a temperature lower than a specific temperature at which the catalytic converter is operated.

* * * * *

UNITED STATES PATENT AND TRADEMARK OFFICE
CERTIFICATE OF CORRECTION

PATENT NO. : 6,162,404　　　　　　　　　　　　　　　　　　　　　Page 1 of 1
DATED : December 19, 2000
INVENTOR(S) : Tojo et al.

It is certified that error appears in the above-identified patent and that said Letters Patent is hereby corrected as shown below:

Claim 1, column 1,
Line 17, after "includes" insert -- fibers --;
Line 18, delete "and randomly".

Signed and Sealed this

Twenty-third Day of October, 2001

Attest:

*Nicholas P. Godici*

NICHOLAS P. GODICI
*Attesting Officer*　　*Acting Director of the United States Patent and Trademark Office*

UNITED STATES PATENT AND TRADEMARK OFFICE
CERTIFICATE OF CORRECTION

PATENT NO. : 6,162,404
DATED : December 19, 2000
INVENTOR(S) : Tojo et al.

Page 1 of 1

It is certified that error appears in the above-identified patent and that said Letters Patent is hereby corrected as shown below:

Column 14,
Line 17, after "includes" insert -- fibers --;
Line 18, delete "and randomly".

This certificate supersedes Certificate of Correction issued October 23, 2001.

Signed and Sealed this

Twenty-ninth Day of January, 2002

Attest:

Attesting Officer

JAMES E. ROGAN
Director of the United States Patent and Trademark Office